Dec. 23, 1969      G. L. NELSON      3,485,524
REMOVABLE LOAD COVERS
Filed March 18, 1968
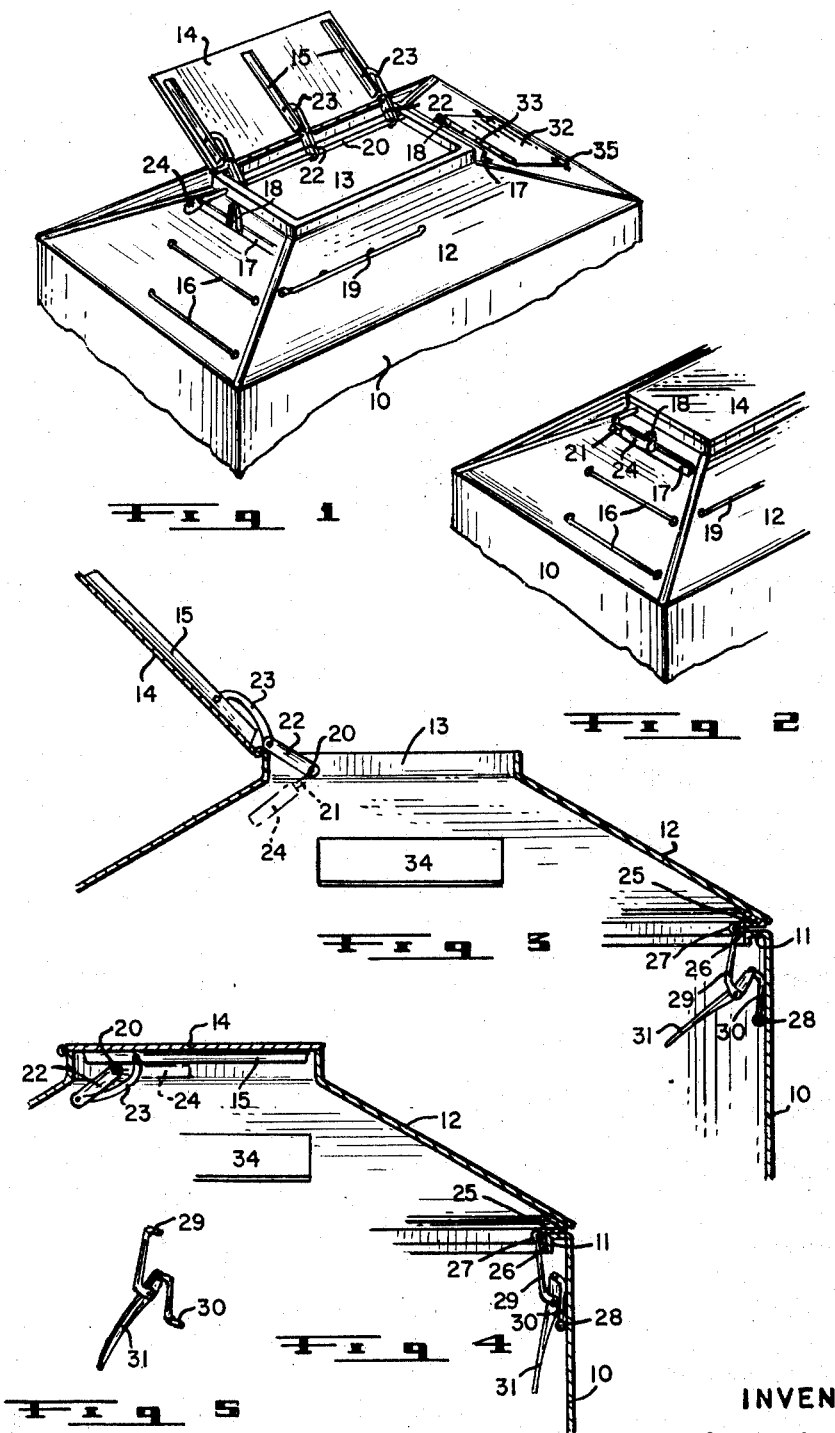
INVENTOR
George L. Nelson
Agent

United States Patent Office 3,485,524
Patented Dec. 23, 1969

3,485,524
REMOVABLE LOAD COVERS
George L. Nelson, Box 217, Wilcox,
Saskatchewan, Canada
Filed Mar. 18, 1968, Ser. No. 713,700
Int. Cl. B60p 7/02, 7/06
U.S. Cl. 296—100                    4 Claims

ABSTRACT OF THE DISCLOSURE

A frusto-pyramid cover for a truck to protect the load and prevent material falling or blowing off; said cover having an upper filler opening closable by a hinged door which is lockable in both open and shut positions; inner fastening means for clamping the cover to the truck body; exterior ladder means for observation of the filling or entrance to the body by the operator; and a rear door opening for manual clearance of the truck, when dumping.

---

The majority of trucks for hauling material are open-topped and exposed to the elements, while the material itself is often loose, such as earth, gravel, fertilizer, et cetera, and is inclined to fall off or be blown off the truck when same is overfilled and travelling on a highway, thus increasing the irregularity of the road surface besides incurring loss to the owner. If the loads on these trucks were reduced more trips would be necessary to carry the same quantity and the cost of the transportation would be increased.

The principal objects of the present invention are: to provide a cover for a truck box to protect the material therein from the elements; hold loose material in and prevent falling or blowing off; while greater quantity of such material can be carried.

A further object of the invention is: to mount the cover for removability from the truck and provide a simple interior releasable fastening means therebetween.

A further object of the invention is: to provide a main entrance through the upper part of the cover which is closable by a hinged door, said door being lockable when swung into either the open or closed positions.

Further objects of the invention are: to provide mounting steps on the cover up to said entrance, and a further auxiliary entrance at the rear of the cover for manual clearing of the truck, after dumping.

A still further object of the invention is: to provide means for removing and elevating the said cover into a roof of a drive shed or the like, when not in use, and such that it will be ready for quick re-attachment.

With the above important and other minor objects in view, which will become more apparent as the disclosure proceeds, the invention consists essentially in the design, construction and arrangement of the various parts hereinafter more particularly described, reference being had to the accompanying drawings wherein like characters of reference indicate corresponding parts in the several figures, and wherein:

FIGURE 1 is a perspective view of the upper part of a truck body, with the cover thereon and the main entrance door open.

FIGURE 2 is a view similar to FIGURE 1 but showing a partial end view with the main entrance door shut.

FIGURE 3 is an enlarged cross section through the upper part of the truck body and showing the cover with the main entrance door locked open and the fastening means for the cover released.

FIGURE 4 is a similar view to FIGURE 3 but showing both the main entrance door and the fastening means locked closed.

FIGURE 5 is a perspective view of the fastening means per se.

The body of a truck is generally indicated by the reference numeral 10 and its upper edge thereof is turned inward therearound in an inverted channel-shape, as shown at 11 in FIGURES 3 and 4. The truck cover comprising this invention is generally indicated by the reference 12 and is in the form of a frustum of a pyramid, the upper part terminating in a rectangular-shaped main opening 13 which is closable by a hinged door 14. This door is provided with three cross angle irons 15 for reinforcement. A pair of steps 16 are externally provided on the right hand corner of the front sloping surface. These steps are formed from rods which have their ends turned down and secured to the cover, and they present a ladder for the operator to mount, observe the filling, or enter the truck body through the main opening 13. A cross angle iron 17 is provided at each end of the cover, adjacent the main opening 13, and each of these angle irons centrally support an inverted U-shaped eye 18 for lifting the cover from the truck by suitable tackle (not shown). A further step rod 19 is provided on one side of the cover so the operator can foot-move along the side of the opening 13.

A small shaft 20 crosses the opening 13, is bearinged in each end wall thereof and one end projects ahead above the cover and bent at right angles to form a hand control 21. Three cranks 22 are spaced on and carried by this shaft within the opening 13. The outer ends of said cranks pivotally connect with the ends of short curved arms 23 having their opposite ends pivotally mounted on the angles 15, for control of the door 14. By observing FIGURE 3 it will be seen that the control 21 has swung the door 14 to open position and the cranks 22 and arms 23 are dead-center locked to maintain it open. When the control 21 is reversed to shut the door, as shown in FIGURE 4, the same cranks and arms are again dead-center locked to prevent it being accidentally opened, other than by said control. It should be mentioned at this time that the control 21 carries a telescoped resilient handle 24, such as those used for the steering handles of bicycles. When the door 14 is shut, this control handle is positioned horizontal and adjacent the front lifting eye 18 of the cover, so a suitable lock can be passed through the eye and over the handle to prevent unauthorized entrance to the truck body.

The base of the cover 12 is interiorly provided therearound with a reinforcing Z-shaped facing 25 which is adapted to rest on the inturned upper edges of the truck body, the down turned portion 26 guiding the cover into proper alignment with the walls of the truck body. Two eyes 27 are welded along each of the inner sides of this facing, and a further pair of eyes 28 are also welded to the inner sides of the truck body, below the eyes 27. Fastening means for holding the cover down are shown in detail in FIGURE 5. These fastening means consist of a pair of hooks 29 and 30, the outer ends of which are pivotally connected in spaced relation to one end of a lever 31. The hook 29 is passed through the eye 27 of the facing and the hook 30 is passed through the eye 28 on the truck body, as shown in FIGURE 3. Accordingly, when the lever 31 is pressed downwardly as shown in FIGURE 4, the cover 12 is clamped down onto the truck body walls in a grain-tight fit, and can only be released by lift of the levers 31. It will therefore be seen that when a lock secures the lifting eye 18 to the control handle 24, it will prevent entrance to the truck body and theft of the cover 12.

A small door 32 has its upper edge hinge-secured at 33 to the rear sloping surface of the cover 12 and lays over an opening 34 in said surface. The lower corners of this door are provided with well known sliding bolts 34 for holding same shut. The opening 34 below the door is too small for manual entrance but provides means for manual clearing of caught material in the rear corners of the truck body, when same is tipped for rear dump of the material through a tail gate opening (not shown) on the truck body.

When the cover is not in use, it can be stored in any suitable place, but preferably in the roof of a drive shed, on hoisting means (not shown) which can be attached to the cover eyes 18. When required, the truck is driven under the hanging cover, which is let down in place on connected therefrom. The operator can then enter the body through the main opening 13 of the cover and secure the fastening means 29–30–31, as previously explained. In filling the truck body, the door 14 will be open as shown in FIGURE 1 and the material to be transported is poured into the body through the opening 13, without danger of the wind closing the door. The cover will accordingly be filled as well as the truck body, making a good load, without leakage. The door 14 is then closed by the control handle 24, as shown in FIGURE 4. In this way there is no spilling off or loss by wind when the truck is travelling on the road, and the material is also protected from dirt, rain or sun. When the destination is reached, the truck will be rearwardly dumped in the well-known manner and the material slides out through the the truck body by said hoisting means, which is then distailgate (not shown) opening in the truck. The opening 34 in the cover can be manually opened up for the final clearing. The door 32 is then closed over this latter opening and the truck body righted for return to further work. When not required, the cover 12 can be re-elevated by the hoisting means to the roof of the drive shed, ready for the next time. It will also be appreciated that the cover 12 could be advantageously used on wagon boxes or other forms of transportation.

What I claim as my invention is:

1. A removable load cover for a container, comprising: a cone-shaped member receivable over the container with releasable side clamping means therebetween; said cover member having a filler opening for the container; a door hinge-mounted on the cover for closing and exposing said opening; a shaft rotatably mounted across the opening, with one end thereof extending therepast in a hand control; and linkage means between the shaft and the door, at said opening, for hinging and locking the door in its open and closed positions by the operation of said hand control.

2. A removable load cover as defined in claim 1, wherein said side clamping means each comprise a pair of hooks pivotally mounted in spaced relation on one end of a lever; one of said hooks adapted to catch on the base of said cover and the other of said hooks adapted to catch on the wall of said container, and such that when said lever is manually operated said hooks will clamp said cover into tight contact with the upper edge of said container.

3. A removable load cover as defined in claim 1, wherein said linkage means comprise a lever carried on said shaft at said opening, and the swinging end of said lever is link-connected with said door such that the pivots of the lever and link will be positioned over dead-center, when said door is hinge-swung by said control to both the open and closed positions.

4. A removable load cover for a transport container, comprising: a frusto-pyramid-shaped member receivable over said container, with releasable clamping means therebetween and on each side thereof; said clamping means each presenting a lever having a pair of hooks pivotally mounted in spaced relation on one end of said lever; one of said hooks adapted to connect with the base of said cover, and the other of said hooks adapted to connect with a wall of said container, and such that manual swinging of the lever will cause said hooks to clamp the cover to the container edges; said cover member having a main filler opening and an auxiliary opening therethrough; a door hinge-mounted on the cover for closing and exposing said main opening; a shaft rotatably mounted along the main opening, bearinged in the end walls thereof and having one end extending exteriorly from one of said end walls and presenting a hand control; linkage means between the shaft and the door comprising a plurality of levers carried in spaced relation by the shaft, at said opening, and a plurality of links each connecting one of the levers with the door, and such that the pivot points of the levers and the links will be positioned over dead-center when the door is hinge-swung by the control to its open and its closed position; ladder means on the cover to said main entrance; and a second hinged closure door mounted on the cover for exposing said auxiliary opening to permit manual clearing of the rear corners of said container during the emptying operation.

References Cited

UNITED STATES PATENTS

| | | | |
|---|---|---|---|
| 1,080,948 | 12/1913 | Bigbie | 296—100 |
| 2,846,257 | 8/1958 | Sherrill | 292—258 |
| 2,977,900 | 4/1961 | Farrar | 296—100 |
| 3,008,759 | 11/1961 | Stiefel | 296—100 |
| 3,018,017 | 1/1962 | Hill | 220—55 |

LEO FRIAGLIA, Primary Examiner

ROBERT R. SONG, Assistant Examiner

U.S. Cl. X.R.

105—377